United States Patent [19]

Nagy

[11] 3,745,595
[45] July 17, 1973

[54] SUSPENSION MEANS FOR BUNK BEDS
[75] Inventor: Emery J. Nagy, Burbank, Calif.
[73] Assignee: Kwikee Enterprises Inc. Drain, Oreg.
[22] Filed: Aug. 29, 1972
[21] Appl. No.: 284,644

[52] U.S. Cl. .................................... 5/9 R, 5/10 R
[51] Int. Cl. ............................................ A47c 17/40
[58] Field of Search .................... 248/317; 5/8, 9, 5/10, 11, 13, 17, 27, 28

[56] References Cited
UNITED STATES PATENTS
3,389,409  6/1968  Rogers, Jr. ................................ 5/17
3,456,268  7/1969  Rogers, Jr. ................................ 5/17
3,623,168  11/1971 Rouch ..................................... 5/10 R Primary Examiner—Casmir A. Nunberg
Attorney—R. Welton Whann et al.

[57] ABSTRACT

Suspension means for supporting a bunk bed for translatory movement between a lowered position of use and a raised position on non-use by linkage assemblies respectively at the bed ends, the linkage assemblies providing parallel motion operations so that in one form of the invention the bed remains horizontal and is not tilted, while in another form, through the use of lost motion connections the bed in raised position may be further moved from the usual horizontal raised position to a tilted position to conform with a sloping ceiling. Provision is also made in one embodiment of the invention to shift the bed forwardly and rearwardly in response to the translatory movement so that the path of movement of the bed will be substantially vertical rather than curved. The linkage assemblies are synchronized, and coordinated in their movements by a unique adjustable torsion member.

10 Claims, 3 Drawing Figures

PATENTED JUL 17 1973  3,745,595
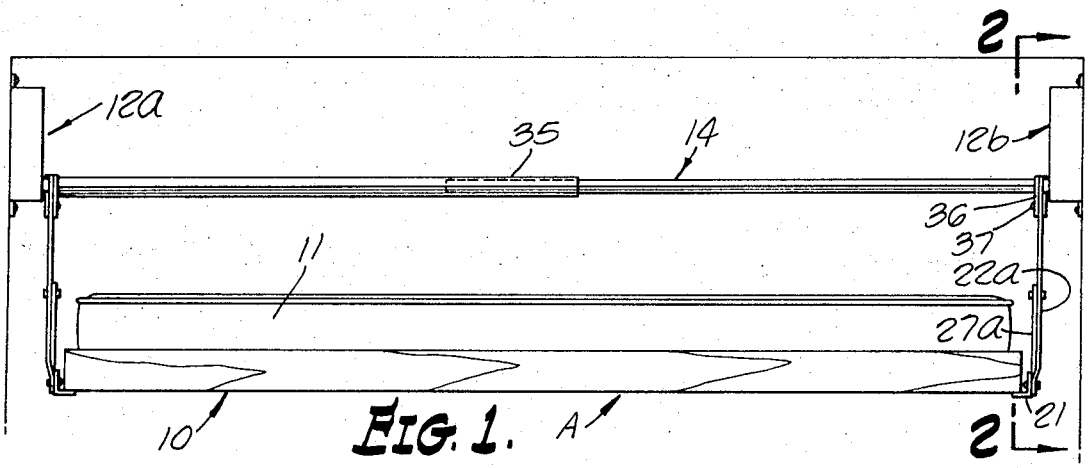
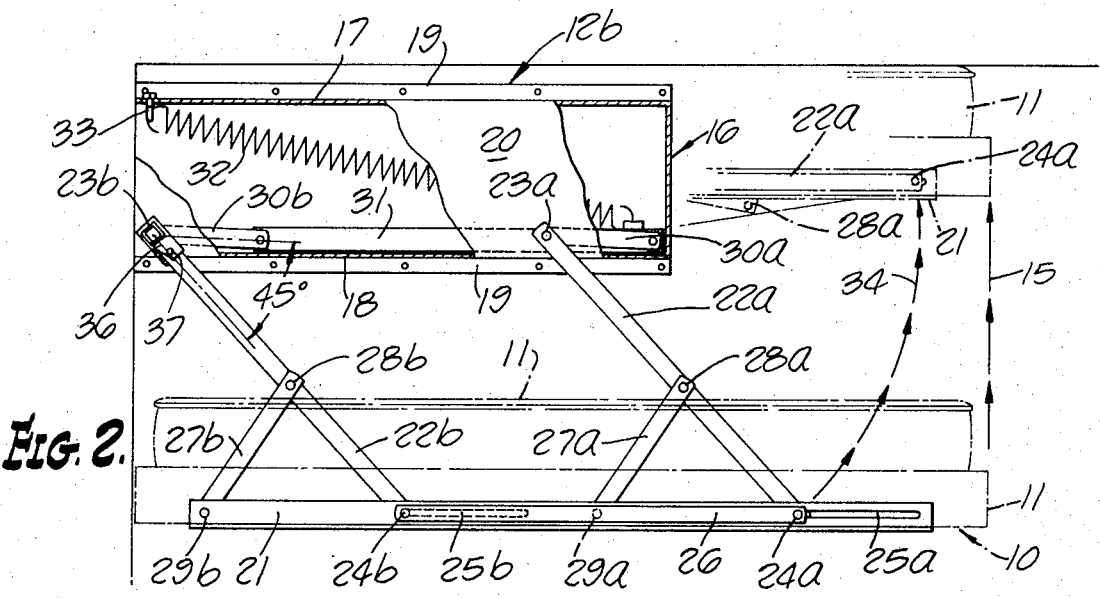
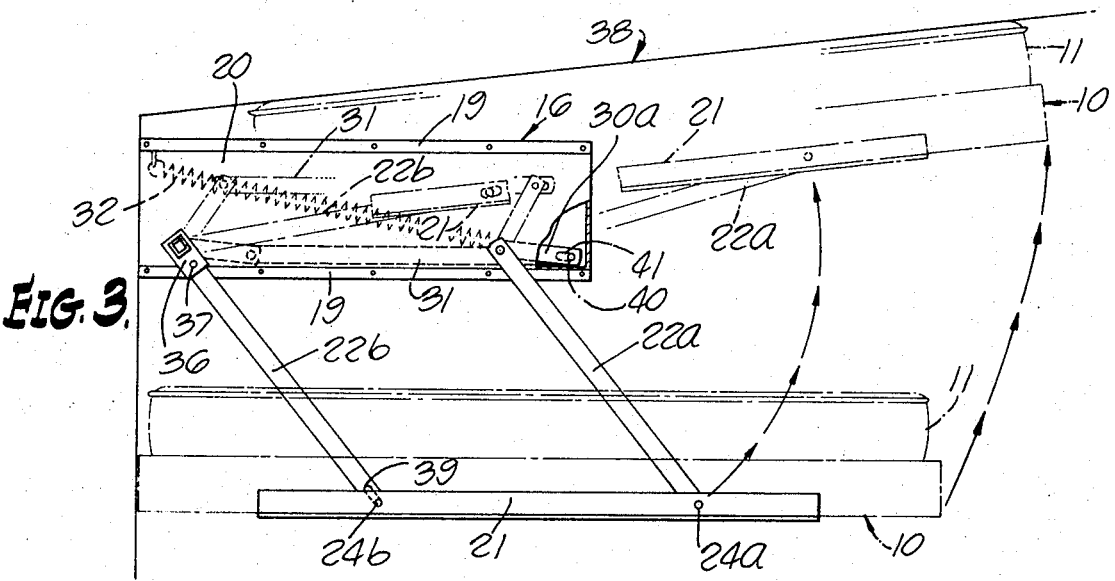

SUSPENSION MEANS FOR BUNK BEDS

BACKGROUND OF THE INVENTION

The present invention relates generally to the field of folding beds.

It has heretofore been known to provide parallel linkage assemblies for the suspension of bunk beds in homes, campers, chassis mounts, motor homes, trailer homes, boats, and the like, but prior to the present invention the equipment was not all that could be desired, and had to be more or less custom fitted to the different installations.

With the current increased activities in the outdoors, camping, mobile homes, and the like, it has become apparent that equipment of greater versatility and adjustability is needed in order to meet the present day requirements.

Accordingly, the suspension means of the present invention, as hereinafter described, has been designed to overcome the inherent problems and disadvantages of the prior known suspension assemblies, and provides a more flexible and versatile design having unique installation and operation features.

SUMMARY OF THE INVENTION

The present invention relates generally to folding beds, and is more particularly concerned with improved suspension means for bunk beds, and control of the path of movement during translatory movement of the bed between positions of use and non-use.

It is one object of the invention to provide suspension means for bunk beds, in the form of suspension assemblies which have greater flexibility of installation, are more efficient in operation, and which guide the bed in a more desirable translatory path of movement.

A further object of the invention is to provide suspension means as described in the preceding object, wherein the suspension assemblies at the ends of the bed are synchronized by a torsion member of improved construction, providing for length adjustment and having improved connection means at each end.

Another object of the invention is to provide suspension linkage assemblies which are controlled during the translatory movement of the bed in such a manner that the bed will follow a substantially vertical path of movement, rather than a curved path.

Still another object is to provide suspension assemblies which may be operated after the bed reaches a raised horizontal position, so as to tilt the bed upon further movement from the horizontal position so as to accommodate the bed generally to a sloping ceiling.

Further objects and advantages of the invention will be brought out in the following part of the specification, wherein detailed description is for the purpose of fully disclosing several embodiments of the invention without placing limitations thereon.

BRIEF DESCRIPTION OF THE DRAWINGS

Referring to the accompanying drawings, which are for illustrative purposes only:

FIG. 1 is a front elevational view of a bunk bed supported by suspension linkage assemblies which embody the features of the present invention, the bunk bed being shown in lowered position;

FIG. 2 is an enlarged elevational view of one of the linkage assemblies, as seen from line 2—2 of FIG. 1, portions being cut away to reveal the cooperative relationship of certain of the linkage members; and FIG. 3 is a similar view of a modified form which permits further movement from a horizontal raised position into a position in which the bed will be rearwardly tilted to conform to a sloping ceiling.

DESCRIPTION OF THE SEVERAL EMBODIMENTS

Referring more specifically to the drawings, for illustrative purposes, the invention is shown as being applied to a bunk bed A such as might be used for a trailer home or the like. The bunk bed may of course vary as to details of construction, but for simplicity herein has been illustrated as embodying a simple substantially rectangular elongate bed frame 10 of wood or other suitable material for receiving a bunk mattress 11 therein.

The bunk bed is supported at its ends by means of right and left linkage assemblies 12a and 12b which support the bunk bed for raising and lowering movements between a lowered position of use, as shown in FIG. 1, and a raised position of non-use. The operation of the linkage assemblies 12a and 12b are synchronized and coordinated through an interconnecting torsion member as generally indicated at 14.

Since each of the linkage assemblies are basically the same with respect to their components and operation, it is believed that it will only be necessary to describe one of the linkage assemblies. For such purpose there is shown in FIG. 2 an embodiment of the invention in which the components of the linkage assembly are so designed that the bunk bed instead of having a curved translatory movement between lowered and raised positions will have a rectilinear movement such that the translatory movement of the bed will follow a substantially vertical path as indicated at 15.

More specifically, the linkage assembly comprises a main frame member 16 of shallow box-like construction which forms a protective housing for certain components of the assembly. Relatively shallow top and bottom walls 17 and 18 are provided with mounting flanges, respectively, as indicated at 19, which facilitate the mounting of the main frame on an adjacent surface. At the other side of the top and bottom walls, there is provided a connecting facing wall 20 which extends vertically and horizontally in outwardly spaced relation to the ends of the bed frame 10.

An elongate end rail 21 preferably of angular section is connectable by conventional means with the adjacent end of the bed frame 10.

A pair of front and rear link members 22a and 22b are shown as having one set of their corresponding ends pivoted in horizontally spaced relation on said facing wall by fixedly connected pivot pins 23a and 23b respectively, which are supported in appropriate bearings (not shown) in the facing wall 20. The other ends of the link members 22a and 22b are pivoted in horizontally spaced relation on the end rail 21 by pivot pins 24a and 24b respectively, these pins being arranged for sliding movement within the rail slots 25a and 25b. The spacing of the pivot pins 24a and 24b is maintained by means of a spacing bar 26 which connects at its ends with the pivot pins.

In order to accomplish forwardly and rearwardly shifting movement of the end rail 21 in response to translatory movement of the bed, so as to obtain the vertical path of movement, rail shifting links 27a and 27b are utilized to interconnect pivot points on the link members with pivot points on the end rail, these pivot points being spaced from the pivot pins 24a and 24b as shown. The rail shifting link 27a is connected to the link member at pivot 28a and to the rail by pivot 29a, while the rail shifting link 27b is similarly connected to its link member by pivot 28b and to the rail by pivot 29b. It will be observed that the structure thus far described provides in effect a parallel motion linkage.

At the upper ends of the link members 22a and 22b, the pivot pins 23a and 23b are fixedly secured to the inner ends of short arm members 30a and 30b respectively, the outer ends of these arm members being pivotally connected with the respective ends of a tie bar 31. The right end of this tie bar is connected to one end of a tension spring 32 which has its other end anchored to the top wall 17 by means of a connector 33. As arranged, the spring 32 provides a balancing force for the weight of the suspended mass including the bed structure, and normally applies a force which tends to motivate the linkage through a translatory bed raising path.

While the outer ends of the link members 22a and 22b move through an arcuate path as indicated at 34, in carrying the bed from its lowered position to a raised position, the rail shifting links will swing in a clockwise direction about their pivots, with the result that the rail 21 is progressively moved rearwardly at a rate which will compensate for the curvature of the path 34 in such a way as to carry the bed through a vertical path as indicated at 15. A saving of space is thus obtained, since the bed is not shifted forwardly.

It will be appreciated that the operation of the right and left likage assemblies must be snychronized and coordinated, and this is done through the torsion member 14, as previously mentioned. It is a feature of the present invention to utilize a torsion member which may be adjusted lengthwise in order to accommodate to different bed lengths. For this purpose, the torsion member is made of multisided tubular members which are telescoped at their adjacent ends as indicated at 35. At each outer end, there is provided a right angled channel-shaped extension 36 which is adapted to laterally receive a portion of the link member 22b at its upper end therein, a removable bolt or appropriate fastening means 37 being provided to secure the end of the torsion member in axial alignment with the pivot pin 23b. As thus arranged, the torsion member is easily installed and adjusted.

The embodiment shown in FIG. 3 differs from that of FIG. 2 in that the rail shifting links have been omitted, as well as the rail slots which provide the feature of raising the bed in a substantially vertical path. That is to say, in the arrangement of FIG. 3, the bed is raised and lowered in a curved path. Similar components have been indicated by similar numbers in FIG. 3, as have been used in the previous description. The arrangement of FIG. 3, however, embodies the feature of permitting further translatory movement beyond the upper horizontal position, designed to permit accommodating the raised bed against a rearwardly sloping ceiling as generally indicated by the numeral 38.

The structural difference which provides this feature will now be explained. The pivot pin 24b is in this case fixed on the end rail 21 and extends into an end slot 39 at the lowermost end of the link member 22b. This arrangement provides a lost motion connection at this point. A similar lost motion connection is provided at the outermost end of the arm member 30a, wherein pivot pin 40 fixed to the arm 30a extends into an end slot 41 at the right end of the tie bar 31. It will be observed that in the normal translatory movement of the bed from its horizontal position of use to the horizontal raised position, the pins 24b and 40 are at the outermost ends of their associated slots. As the translatory movement is continued, to a position in which the bed is tilted, it will be observed that the pins move to the inter-ends of associated slots so as to provide the tilting action.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific forms shown or uses mentioned, except to the extent indicated in the appended claims.

I claim:

1. Suspension means for supporting an elongate generally rectangular bunk bed structure for translatory movement between a lowered position of use and a raised position of non-use, comprising:
   a. a pair of linkage assemblies at each end of the bed structure, each comprising:
      an elongate main frame adapted for fixed mounting on an adjacent medium, said frame having a vertical facing wall spaced outwardly of and extending in a generally parallel direction along the adjacent end of the bed structure;
      an elongate rail member adapted for supporting connection with the adjacent end of the bed structure;
      a pair of front and rear link members having one set of their corresponding ends pivoted in horizontal spaced relation on said facing wall and their other ends pivoted in horizontally spaced relation on said rail member, and coacting with said facing wall and rail member to provide a parallel motion linkage;
      a tension spring having a connection with at least one of said link members for normally urging the link members towards a raised position of the bed structure; and
   b. a torsion member extending between said assemblies for synchronizing the swinging movement of the link members therein, said torsion member having telescoped sections providing length adjustment, and at each end being removably connected with the rear link member in axial alignment with its pivotal axis on said facing wall.

2. Suspension means according to claim 1, wherein the rear link member comprises a bar, and the torsion member has an end connection bracket formed with a U-shaped channel for laterally receiving an adjacent portion of the bar therein; and including means for retaining the bar and channel in connected relation.

3. Suspension means according to claim 1, wherein the telescoped portions of said torsion member are of tubular multi-sided cross section.

4. Suspension means according to claim 1, including means for longitudinally shifting said rail member in response to raising and lowering translatory movements of the bed structure so as to conform the bed movement to a substantially vertical path.

5. Suspension means according to claim 4, wherein said other ends of the link members have their rail pivots respectively slidable in longitudinally extending rail slots, and including rail shifting links respectively connected between each of said link members and the rail member with one end being pivoted on the link member in spaced relation to its rail pivot, and the other end being pivoted on the rail member in rearwardly spaced relation to the associated rail pivot.

6. Suspension means according to claim 5, including a spacer bar having its ends respectively connected to the rail pivots of the link members.

7. Suspension means according to claim 1, including means operative at the raised position of the bed structure for effecting a tilting movement of the bed to a position conforming to a rearwardly downwardly sloping ceiling.

8. Suspension means according to claim 7, in which the link members respectively carry a fixed angle arm extending inwardly from the link pivot on the facing wall; a tie bar having one end pivoted to the outer end of the arm associated with the rear link member, and its other end connected to the outer end of the arm associated with the front link member by a lost motion connection; and the connection of the rear link member to the rail member comprises a lost motion connection.

9. Suspension means according to claim 8, wherein the lost motion connections respectively include a pin and slot.

10. Suspension means according to claim 8, wherein the arms extend at an angle of substantially 45° with respect to their associated link member.

* * * * *